(12) United States Patent
Plain et al.

(10) Patent No.: US 11,603,187 B2
(45) Date of Patent: Mar. 14, 2023

(54) DOOR ALIGNMENT FOR AIRCRAFT LANDING GEAR

(71) Applicant: The Boeing Company, Chicago, IL (US)

(72) Inventors: Katie M Plain, Charleston, SC (US); Kristina R Mauger, Charleston, SC (US)

(73) Assignee: The Boeing Company, Chicago, IL (US)

( * ) Notice: Subject to any disclaimer, the term of this patent is extended or adjusted under 35 U.S.C. 154(b) by 1063 days.

(21) Appl. No.: 16/264,439

(22) Filed: Jan. 31, 2019

(65) Prior Publication Data
US 2020/0247532 A1 Aug. 6, 2020

(51) Int. Cl.
*B64C 25/16* (2006.01)
*B64C 25/20* (2006.01)

(52) U.S. Cl.
CPC .............. *B64C 25/16* (2013.01); *B64C 25/20* (2013.01)

(58) Field of Classification Search
CPC ......... B64C 25/16; B64C 25/20; B64C 25/24; B64C 25/26; B64F 5/10
See application file for complete search history.

(56) References Cited

U.S. PATENT DOCUMENTS

| | | | | |
|---|---|---|---|---|
| 2,283,476 A | * | 5/1942 | Waibel | B64C 25/24 244/102 R |
| 5,310,140 A | * | 5/1994 | Veaux | F16F 9/06 244/104 FP |
| 7,647,879 B2 | * | 1/2010 | del Valle Bravo | B63B 17/02 114/361 |
| 2011/0127376 A1 | * | 6/2011 | Gleyse | B64C 25/22 244/102 R |
| 2020/0172066 A1 | * | 6/2020 | Burte | B60T 8/325 |

* cited by examiner

*Primary Examiner* — Joshua J Michener
*Assistant Examiner* — Colin Zohoori
(74) *Attorney, Agent, or Firm* — Duft & Bornsen, PC

(57) ABSTRACT

Systems and methods are provided for door alignment of an aircraft landing gear door. One embodiment is an apparatus that includes a plurality of adjustable rods configured to temporarily install in an aircraft to stand in place of a final adjustable part, each of the adjustable rods configured to position a block for stopping a door of the aircraft. Each of the adjustable rods includes a telescopic body configured to extend and retract in length, and a spring configured to compress to reduce the length of the telescopic body, and to expand to extend the length of the telescopic body. Each adjustable rod also includes a locking mechanism configured to lock the telescopic body at a fixed length to prevent expansion of the spring, and to unlock the telescopic body to release the spring and adjust the telescopic body to an adjusted length.

20 Claims, 9 Drawing Sheets

DOOR ALIGNMENT FOR AIRCRAFT LANDING GEAR

FIELD

The disclosure relates to the field of aircrafts, and in particular, to landing gear doors of aircrafts.

BACKGROUND

Jet aircrafts have landing gears that can be stowed during flight and deployed for landing. A landing gear door opens and closes to allow the landing gear to extend from and retract into the wheel well of the aircraft. Unfortunately, aligning the landing gear door during production of an aircraft is difficult and labor intensive.

SUMMARY

Embodiments described herein provide door alignment for aircraft landing gear. A door alignment tool is provided which emulates a combination of door stop components for a landing gear door. The door alignment tool is temporarily installed in the aircraft prior to installing the final door stop components. With the door alignment tool installed in the aircraft, self-adjusting rods adjust in length while the landing gear door is placed into alignment with the fuselage as desired. The lengths of the self-adjusting rods while the landing gear door is in alignment are used to set the lengths of the rods of the final door stop components. The lengths of the final rods are thus accurately set by using the door alignment tool to emulate the final rods prior to installation, rather than by simply installing the final rods and performing time-consuming incremental adjustments. Advantageously, the door alignment tool enables setting and installing the final rods accurately at reduced cost and labor.

One embodiment is an apparatus that includes a plurality of adjustable rods configured to temporarily install in an aircraft to stand in place of a final adjustable part, each of the adjustable rods configured to position a block for stopping a door of the aircraft. Each of the adjustable rods includes a telescopic body configured to extend and retract in length, and a spring configured to compress to reduce the length of the telescopic body, and to expand to extend the length of the telescopic body. Each adjustable rod also includes a locking mechanism configured to lock the telescopic body at a fixed length to prevent expansion of the spring, and to unlock the telescopic body to release the spring and adjust the telescopic body to an adjusted length. The adjusted length of each of the adjustable rods positions the block for stopping the door of the aircraft.

Another embodiment is a method that includes temporarily installing one or more adjustable rods on an aircraft to emulate one or more structural members of a door stop for an aircraft door, closing the aircraft door to an aligned position with a fuselage of the aircraft, and actuating a locking mechanism to release a spring in the one or more adjustable rods to adjust each adjustable rod to an adjusted length while the aircraft door is in the aligned position. The method also includes setting a length of each of the structural members of the door stop based on the adjusted length of each of the one or more adjustable rods, uninstalling the adjustable rods from the aircraft, and installing the one or more structural members on the aircraft, wherein the length of the one or more structural members positions the door stop to stop the aircraft door in the aligned position with the fuselage.

A further embodiment is a system that includes a plurality of adjustable rods configured to temporarily install in an aircraft to stand in place of a final aircraft part, each of the adjustable rods configured to position a structure for stopping an aircraft door into an aligned position with a fuselage. Each of the adjustable rods includes an upper portion and a lower portion configured to slide with respect to one another to adjust a body length of the adjustable rod, a spring disposed inside the adjustable rod, and a locking mechanism disposed inside the adjustable rod and configured to lock the spring in a compressed position, and to release the spring from the compressed position to slide the upper portion and the lower portion away from one another and adjust the body length of the adjustable rod. The system also includes a remote control device configured to remotely actuate the locking mechanism to extend each of the adjustable rods to the body length which positions the structure for stopping an aircraft door into the aligned position with the fuselage.

Other illustrative embodiments may be described below. The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1A:
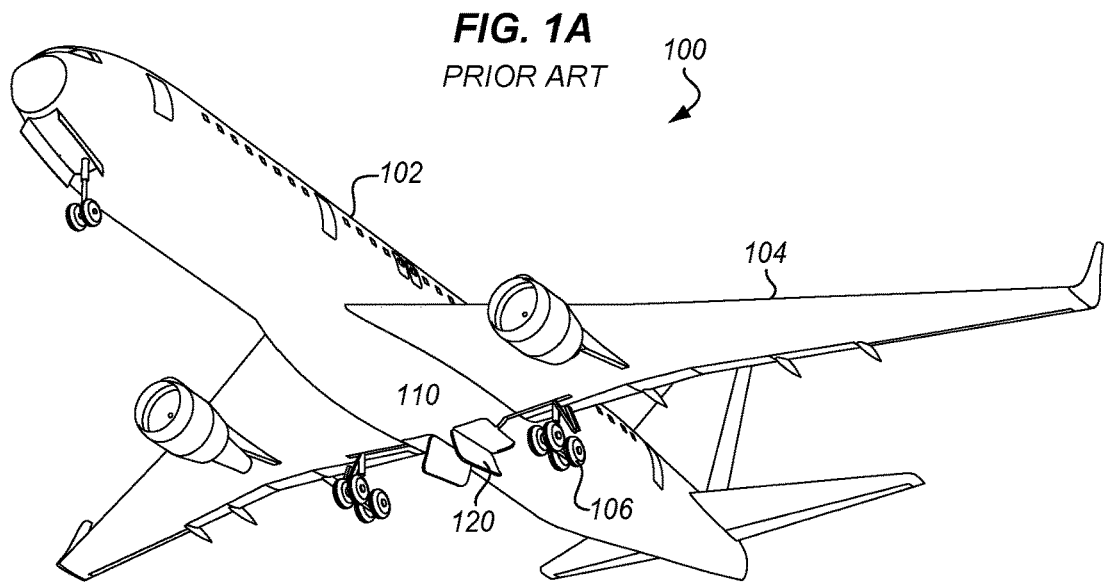
FIG. 1A illustrates an aircraft.

FIG. 1A illustrates an aircraft 100. The aircraft 100 includes a fuselage 102, wings 104, and landing gear 106. The landing gear 106 typically includes one or more wheels and struts to support the aircraft 100 on the ground for takeoff and landing. During flight, the landing gear 106 is stowed in a wheel well 110 of the aircraft 100. A landing gear door 120 attached to the fuselage 102 closes to seal the wheel well 110 for aerodynamics. Prior to landing, the landing gear door 120 opens to deploy the landing gear 106.

Figure 1B:
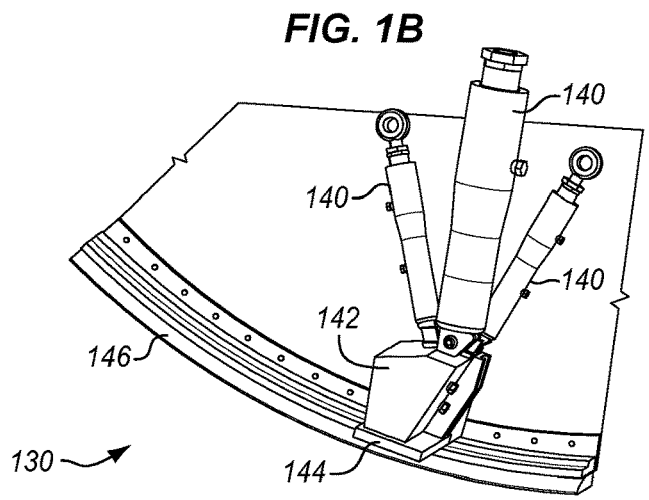
FIG. 1B illustrates internal components of a wheel well of an aircraft.

FIG. 1B illustrates internal components 130 of the wheel well 110 of the aircraft 100. The wheel well 110 includes one or more adjustable support rods 140 that support a door stop 142. In this example, the adjustable support rods 140 include three support members that form a tripod door stop for the landing gear door 120. The door stop 142 includes a door stop surface 144 to oppose the landing gear door 120. During aircraft manufacture or maintenance, the adjustable support rods 140 are adjusted to extend/retract in length to position the door stop 142 such that when the landing gear door 120 closes against the door stop surface 144, the landing gear door 120 properly aligns with a wheel well seal 146 for aerodynamics.

Figure 1C:
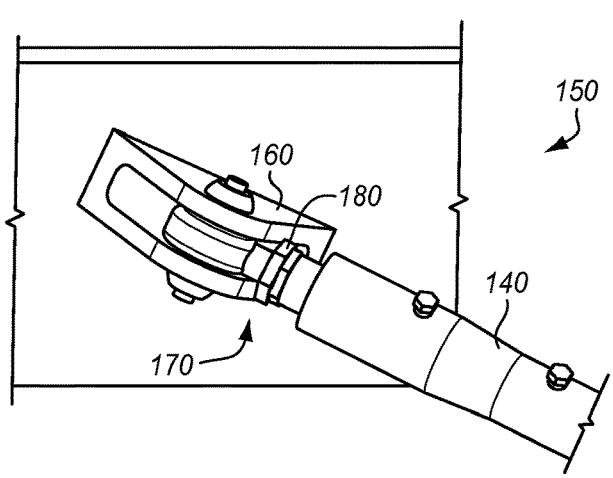
FIG. 1C illustrates an attachment mechanism of an adjustable support rod in a wheel well of an aircraft.

FIG. 1C illustrates an attachment mechanism 150 of the adjustable support rod 140 in the wheel well 110 of the aircraft 100. In particular, one end of the adjustable support rod 140 attaches to a wall 160 of the wheel well 110 via a pivot point 170. The other end of the adjustable support rod 140 attaches to the door stop 142 as shown in FIG. 1B. The length of the adjustable support rod 140 is adjusted by rotating an adjustment nut 180.

The current technique for installing/aligning the landing gear door 120 involves closing the landing gear door 120 against the door stop 142, checking the flushness of the landing gear door 120 with the wheel well seal 146, opening the landing gear door 120 to adjust one or more adjustment nuts 180 of each adjustable support rod 140, and then repeating the process over again. This adjustment process can take up to thirty hours of labor to tune the position of the landing gear door 120 so that it meets strict aerodynamic requirements.

Figure 2:
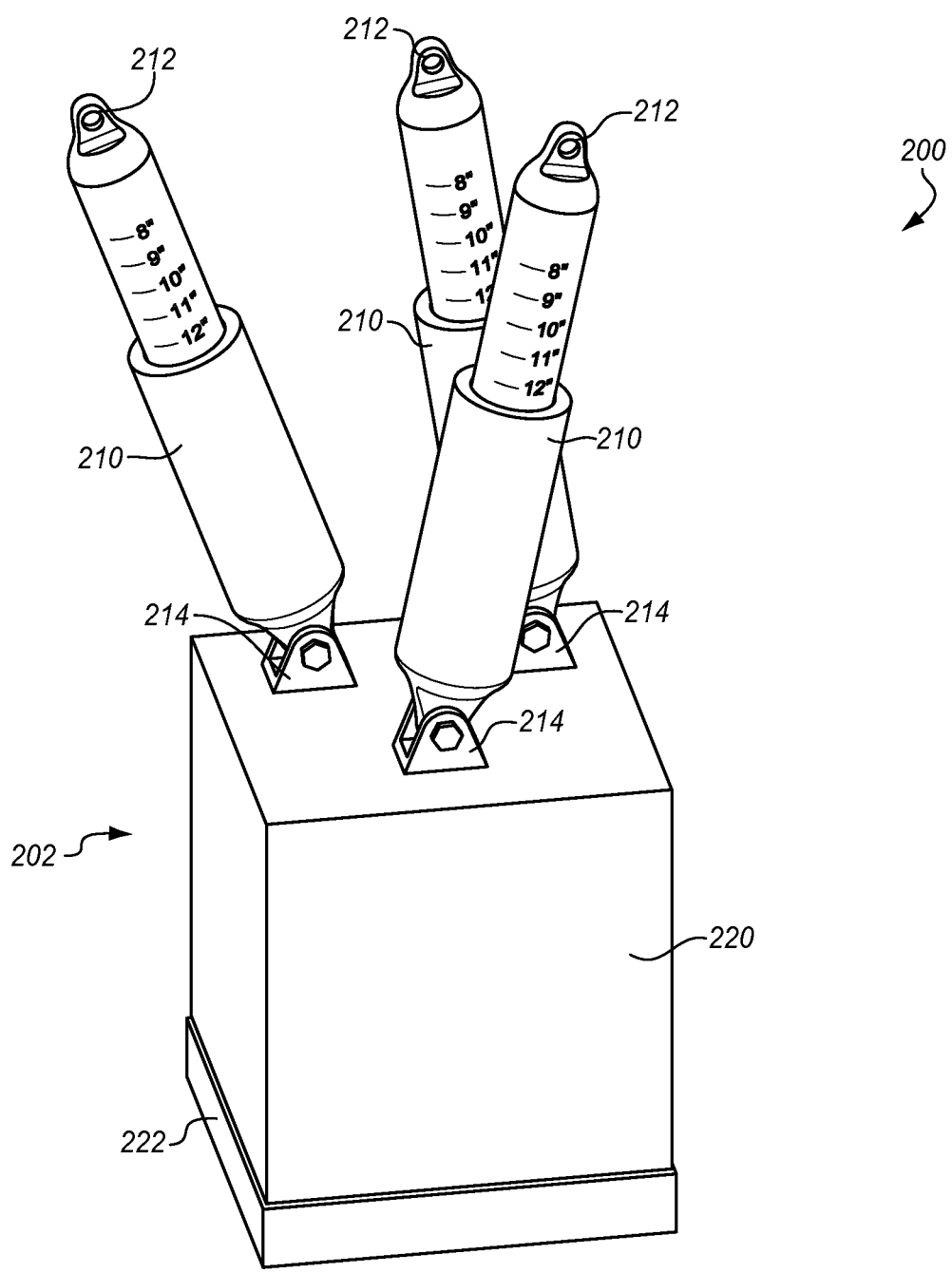
FIG. 2 illustrates a door alignment tool in an illustrative embodiment.

FIG. 2 illustrates a door alignment tool 200 in an illustrative embodiment. The door alignment tool 200 improves the process of aligning an aircraft door (e.g., the landing gear door 120 of the aircraft 100) during production or maintenance of the aircraft. The door alignment tool 200 is temporarily installed in an aircraft to stand in place of one or more final parts to be permanently installed in the aircraft. In other words, the door alignment tool 200 comprises a pre-installation comparison tool used for setting and installing one or more final aircraft components. To do this, the door alignment tool 200 comprises a structure 202 that imitates or mimics the aircraft parts to be installed.

In this embodiment, the door alignment tool 200 imitates the configuration of the tripod door stop for the landing gear door 120 described earlier with respect to FIGS. 1B-1C. In particular, the door alignment tool 200 includes three adjustable rods 210 configured to temporarily install in the aircraft 100 similar to the adjustable support rods 140. That is, first ends 212 of the adjustable rods 210 are each configured to attach to a wall of the aircraft (e.g., the wall 160 of the wheel well 110 via the pivot point 170), and second ends 214 of the adjustable rods 210 are each configured to attach to a base block 220. Thus, the attachment point positions and mechanisms of the adjustable rods 210 may replicate that of the adjustable support rods 140 to be installed at a later time.

The base block 220 includes or imitates the door stop 142 that opposes/aligns the landing gear door 120. The base block 220 may also include a stop pad 222 that includes or imitates the door stop surface 144. The door alignment tool 200 is thus configured to replicate the position and orientation of the door stop components, including the adjustable support rods 140 and the door stop 142, to be installed permanently with the aircraft 100 for aligning the landing gear door 120.

As described in greater detail below, with the door alignment tool 200 temporarily installed in the aircraft, a quick and accurate determination can be made for setting the lengths of one or more final parts (e.g., the adjustable support rods 140) so that the landing gear door 120 closes/aligns with the wheel well seal 146 and meets strict aerodynamic tolerances. Advantageously, the door alignment tool 200 eliminates the cumbersome adjustment process of repeatedly opening and closing the landing gear door 120 to adjust the adjustment nuts 180 of the adjustable support rods 140.

Although the door alignment tool 200 in this embodiment imitates the adjustable support rods 140 and the door stop 142 described in FIGS. 1B-1C, it will be appreciated that the door alignment tool 200 may be configured to imitate alternative door stop configurations including an alternative number of adjustable support rods, alternative attachment configurations or locations with the door stop and/or aircraft wall(s), and/or alternative component types, sizes, or dimensions. Similarly, although described with respect to the landing gear door 120 and the aircraft 100, the door alignment tool 200 may be used for alternative aircraft doors (e.g., nose landing gear door, one or more main landing gear doors, etc.) and alternative aircrafts.

Figure 3:
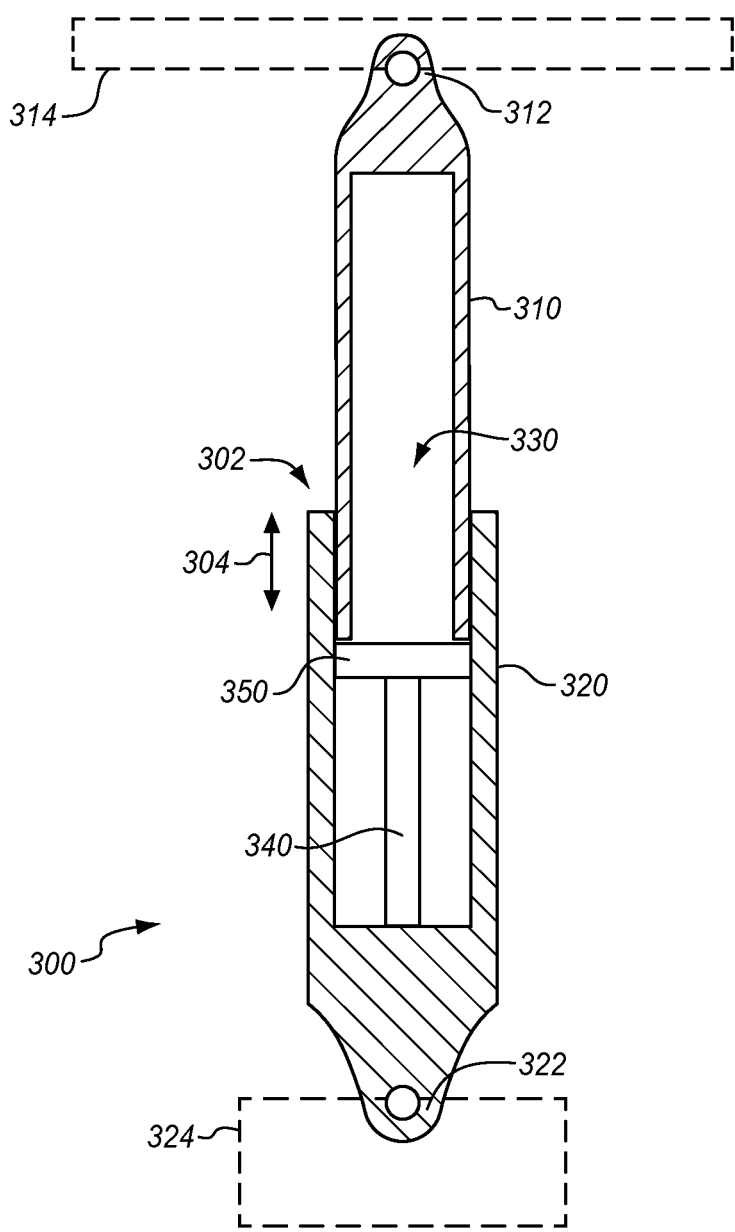
FIG. 3 illustrates a cross-sectional diagram of an adjustable rod in an illustrative embodiment.

FIG. 3 illustrates a cross-sectional diagram of an adjustable rod 300 in an illustrative embodiment. The adjustable rod 300 may comprise one of the adjustable rods 210 of the door alignment tool 200. In other words, the door alignment tool 200 may include one or more adjustable rods 300 configured to imitate one or more final parts of the aircraft 100 (e.g., one or more adjustable support rods 140).

The adjustable rod 300 includes a telescopic body 302 configured to extend and retract in length along a longitudinal axis 304. In one embodiment, the telescopic body 302 includes an upper portion 310 and a lower portion 320 forming tubular sections configured to slide into one another. The upper portion 310 includes a first distal end 312 to temporarily attach to a wall 314 (e.g., the wall 160 of the wheel well 110 via the pivot point 170). The lower portion 320 includes a second distal end 322 opposite to the first distal end 312 to attach with a block 324 (e.g., the base block 220). The adjustable rod 300 may thus adjust in length and pivot at its attachment points to position/orient the block 324 against the landing gear door 120 at a particular position and orientation.

The upper portion 310 and the lower portion 320 overlap one another along the longitudinal axis 304 to form a hollow cavity 330 enclosed within the telescopic body 302. Inside the hollow cavity 330, the adjustable rod 300 includes a spring 340 and a locking mechanism 350. The spring 340 is configured to compress along the longitudinal axis 304 to reduce the length of the telescopic body 302, and to expand along the longitudinal axis 304 to extend the length of the telescopic body 302. The locking mechanism 350 is configured to lock the telescopic body 302 at a fixed length and prevent expansion of the spring 340, and to unlock the telescopic body 302 to release the spring 340 and adjust the telescopic body 302 to an adjusted length.

The spring 340 and the locking mechanism 350 provide a technical benefit in enabling the adjustable rod 300 to expand/retract itself into place to position the block 324 against the landing gear door 120. That is, unlike a final part of the aircraft 100 such as the adjustable support rod 140 that adjusts in length via the adjustment nut 180, the adjustable rod 300 advantageously adapts its length inside the wheel well 110 as the landing gear door 120 closes to align with the fuselage 102. Accordingly, while the landing gear door 120 is aligned with the fuselage 102 and abutted against the block 324, the spring-adjusted length of the adjustable rod 300 advantageously provides the aircraft technician with a length to set for the final part. Thus, prior to or during installation of one or more adjustable support rods 140 as final parts on the aircraft 100, the aircraft technician may set the lengths of the adjustable support rods 140 according to the spring-adjusted lengths of one or more corresponding adjustable rods 300.

By temporarily installing one or more adjustable rod(s) 300 and the block 324 as placeholders corresponding with one or more adjustable support rod(s) 140 and the door stop 142, respectively, the aircraft technician is able to set the adjustable support rod(s) 140 with length(s) that accurately position the door stop 142 of the landing gear door 120. Therefore, the adjustable support rods 140 may be set at lengths that position the door stop 142 to stop/align the landing gear door 120 with the fuselage 102 without performing the cumbersome process of repeatedly opening and closing the landing gear door 120 to adjust the adjustment nuts 180 of the adjustable support rods 140. In addition to reducing aircraft build time, this enables the adjustable support rods 140 to be accurately set prior to attachment with the aircraft 100 at an offsite location for improved ergonomic conditions as compared to adjusting the adjustable support rods 140 while attached inside the wheel well 110 of the aircraft 100.

Further details of operating the adjustable rod 300 are described below. Although the adjustable rod 300 is described with respect to the door alignment tool 200, it will be appreciated that the adjustable rod 300 may be incorporated into alternative door alignment tools having alternative arrangements to imitate alternative door stop configurations. Similarly, although described with respect to the landing gear door 120 and the aircraft 100, the adjustable rod may be used for alternative aircraft doors (e.g., nose landing gear door, one or more main landing gear doors, etc.) and alternative aircrafts.

Figure 4:
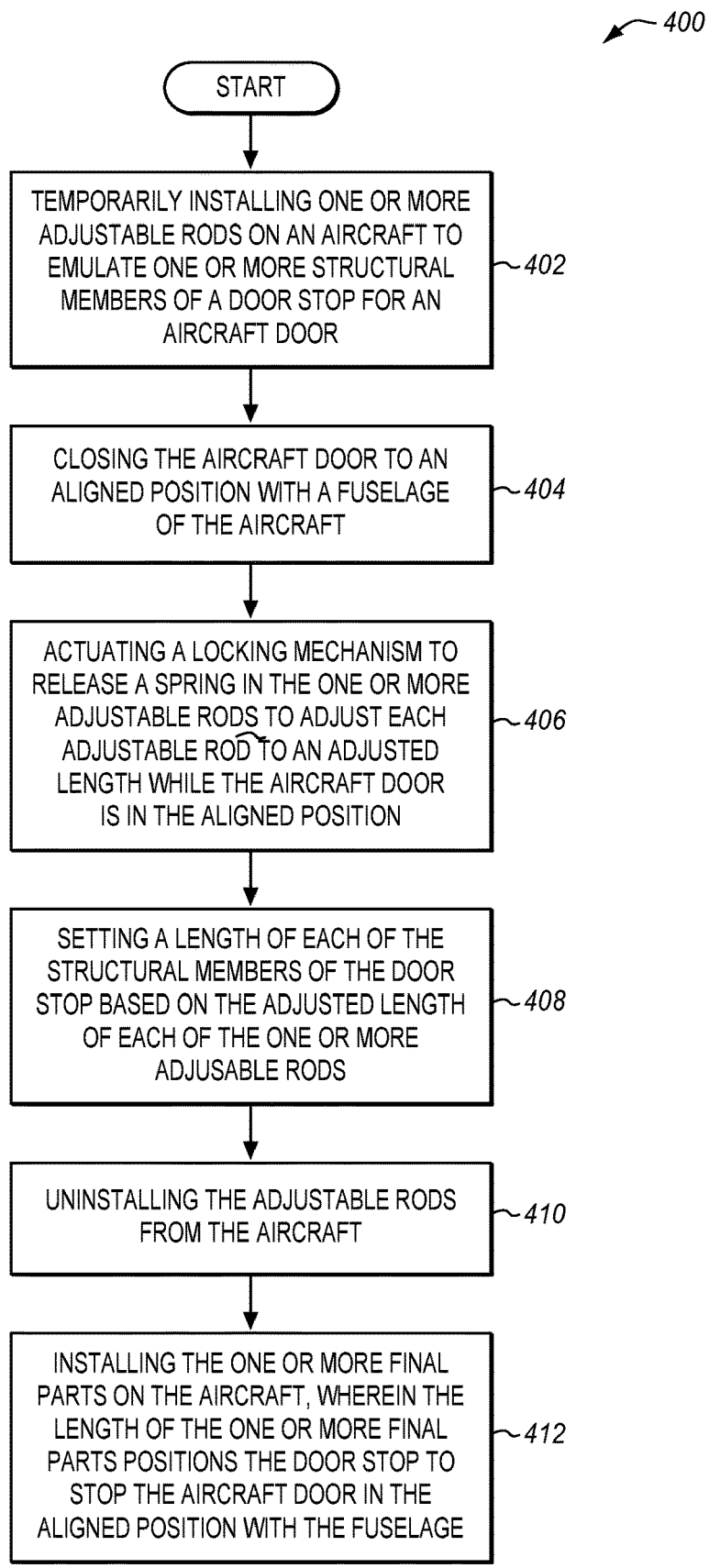
FIG. 4 is a flowchart illustrating a method for aligning a landing gear door of an aircraft in an illustrative embodiment.

FIG. 4 is a flowchart illustrating a method 400 for aligning the landing gear door 120 of the aircraft 100 in an illustrative embodiment. The steps of the flowchart(s) will be described with reference to FIGS. 1A, 1B 1C, 2, and 3, but those skilled in the art will appreciate that the methods may be performed with other systems and devices including alternative aircrafts and door stop configurations. The steps of the flowchart(s) described herein are not all inclusive, may include other steps not shown, and may be performed in an alternative order.

In step 402, one or more adjustable rods 300 are temporarily installed on the aircraft 100 to emulate one or more structural members (e.g., adjustable support rods 140) of a door stop (e.g., door stop 142) for an aircraft door. For example, each adjustable rod 300 may be configured to attach with a block (e.g., base block 220, block 324, or another structure) that imitates a door stop for an aircraft door. The block may include a structure with a similar size and dimension as that of the door stop 142 for the landing gear door 120. As previously described, the one or more adjustable rods 300 may imitate or correspond with one or more adjustable support rods 140 to be installed as final aircraft parts at a later time.

In step 404, the aircraft door is closed to an aligned position with the fuselage 102 of the aircraft 100. For example, in the aligned position, the landing gear door 120 may be shut to form a tight seal with the wheel well seal 146, thereby enclosing the wheel well 110 and forming a flush surface with the fuselage 102. The aircraft door may be held closed in the aligned position manually and/or using one or more support tools.

In step 406, the locking mechanism 350 is actuated to release the spring 340 in the one or more adjustable rods 300 to adjust each adjustable rod 300 to an adjusted length while the aircraft door is in the aligned position. With the adjustable rods 300 at their respective adjusted lengths, the block that comprises or emulates the door stop positions/orients against the back surface of the aircraft door while the aircraft door is in the aligned position. In some embodiments, the spring 340 is released prior to closing the aircraft door to the aligned position such that the adjustable rods 300 compress from the contact of the aircraft door closing against the block. In other embodiments, the spring 340 is initially compressed and locked by the locking mechanism 350 and then released after closing the aircraft door to the aligned position such that the adjustable rods 300 expand to contact the block against the aircraft door.

In step 408, a length of each of the structural members of the door stop is set based on the adjusted length of each of the one or more adjustable rods 300. For example, an aircraft technician may rotate the adjustment nuts 180 of the adjustable support rods 140 so that the lengths of the adjustable support rods 140 correspond or match with the adjusted lengths of the adjustable rods 300 at a time when the aircraft door is in the aligned position. If the adjusted lengths among the adjustable rods 300 are different, each adjustable support rod 140 may be adjusted to a different length according to the adjustable rod 300 that emulates the function/position of that adjustable support rod 140.

In step 410, the adjustable rods 300 are uninstalled from the aircraft 100. For example, the distal end (e.g., the first distal end 312) of each adjustable rod 300 may be detached from the wall 314. The door alignment tool 200 may thus be removed from the pivot points 170 in the wheel well 110 of the aircraft 100.

In step 412, the one or more final parts are installed on the aircraft 100, wherein the length of the one or more final parts positions the door stop to stop the aircraft door (e.g., the landing gear door 120) in the aligned position with the fuselage 102. Accordingly, using method 400, final aircraft parts including one or more adjustable support rods 140 and the door stop 142 are accurately positioned on the aircraft 100 with reduced labor time and expense.

Figure 5A:
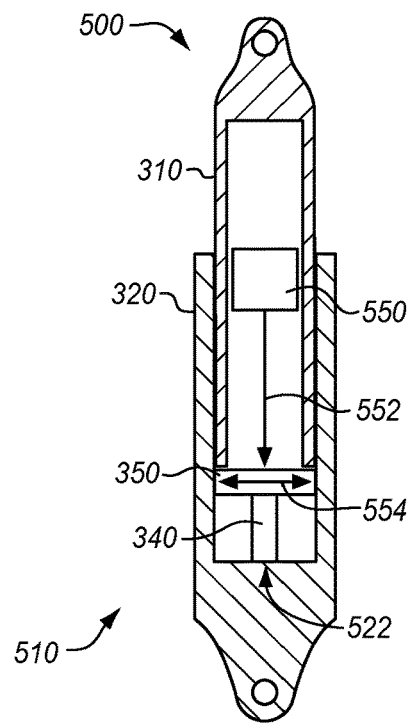
FIG. 5A illustrates a cross-sectional diagram of an adjustable rod in a locked/compressed position in an illustrative embodiment.
Figure 5B:
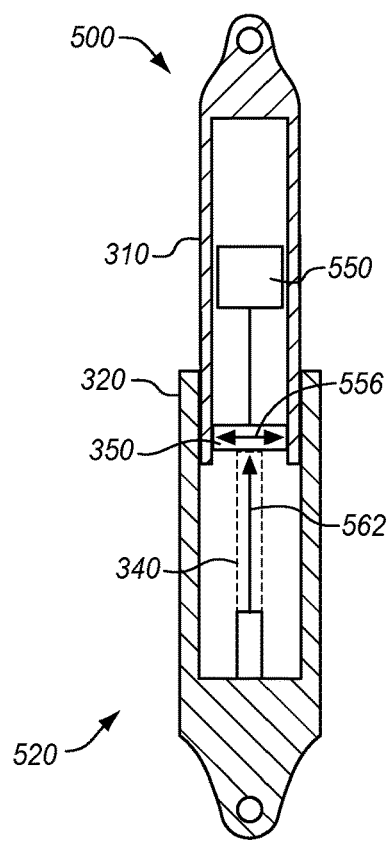
FIG. 5B illustrates a cross-sectional diagram of an adjustable rod in an unlocked/released position in an illustrative embodiment.

FIG. 5A illustrates a cross-sectional diagram of an adjustable rod 500 in a locked/compressed position 510 in an illustrative embodiment. FIG. 5B illustrates a cross-sectional diagram of the adjustable rod 500 in an unlocked/released position 520 in an illustrative embodiment. In FIGS. 5A-5B, the adjustable rod 500 includes similar components to that of the adjustable rod 300 described previously with respect to FIG. 3 and their description is therefore omitted for FIGS. 5A-5B for sake of brevity.

The adjustable rod 500 includes a motor 550 configured to drive the locking mechanism 350. In this embodiment, the motor 550 is disposed in the upper portion 310 above the locking mechanism 350, while the spring 340 is disposed in the lower portion 320 below the locking mechanism 350. In particular, an end of the spring 340 is attached to a bottom surface 522 of the lower portion 320. However, it will be appreciated that alternative arrangements, including an opposite upper/lower configuration of components to that described above, are contemplated.

To place the adjustable rod 500 into the locked/compressed position 510 shown in FIG. 5A, a user applies a compressing force 552 (e.g., along the longitudinal axis 304) to the spring 340 and locks it in place with the locking mechanism 350 and the motor 550. The motor 550 applies a rotational force to the locking mechanism 350 to radially expand the locking mechanism 350. As the locking mechanism 350 rotates it expands radially outward to the inner walls of the lower portion 320, as shown by arrow 554. This locks the upper portion 310 and the lower portion 320 together and prevents the spring 340 from expanding from its compressed state.

To place the adjustable rod 500 into the unlocked/released position 520 shown in FIG. 5B, the motor 550 applies an opposite rotational force to radially collapse the locking mechanism 350. As the locking mechanism 350 rotates this direction it retracts radially inward to fit between the inner walls of the upper portion 310 as shown by arrow 556. This unlocks the upper portion 310 and the lower portion 320 from one another and allows the spring 340 to expand. The spring 340 extends upwardly against the bottom surface 522 of the lower portion 320 and applies an upward force 562 to the locking mechanism 350. With the locking mechanism 350 collapsed radially inward, the spring 340 therefore slides the upper portion 310 and the lower portion 320 longitudinally away from each other to extend the longitudinal length of the adjustable rod 500. The adjustable rod 500 is thus configured to transition between the locked/compressed position 510 and the unlocked/released position 520 via internal components.

Figure 6:
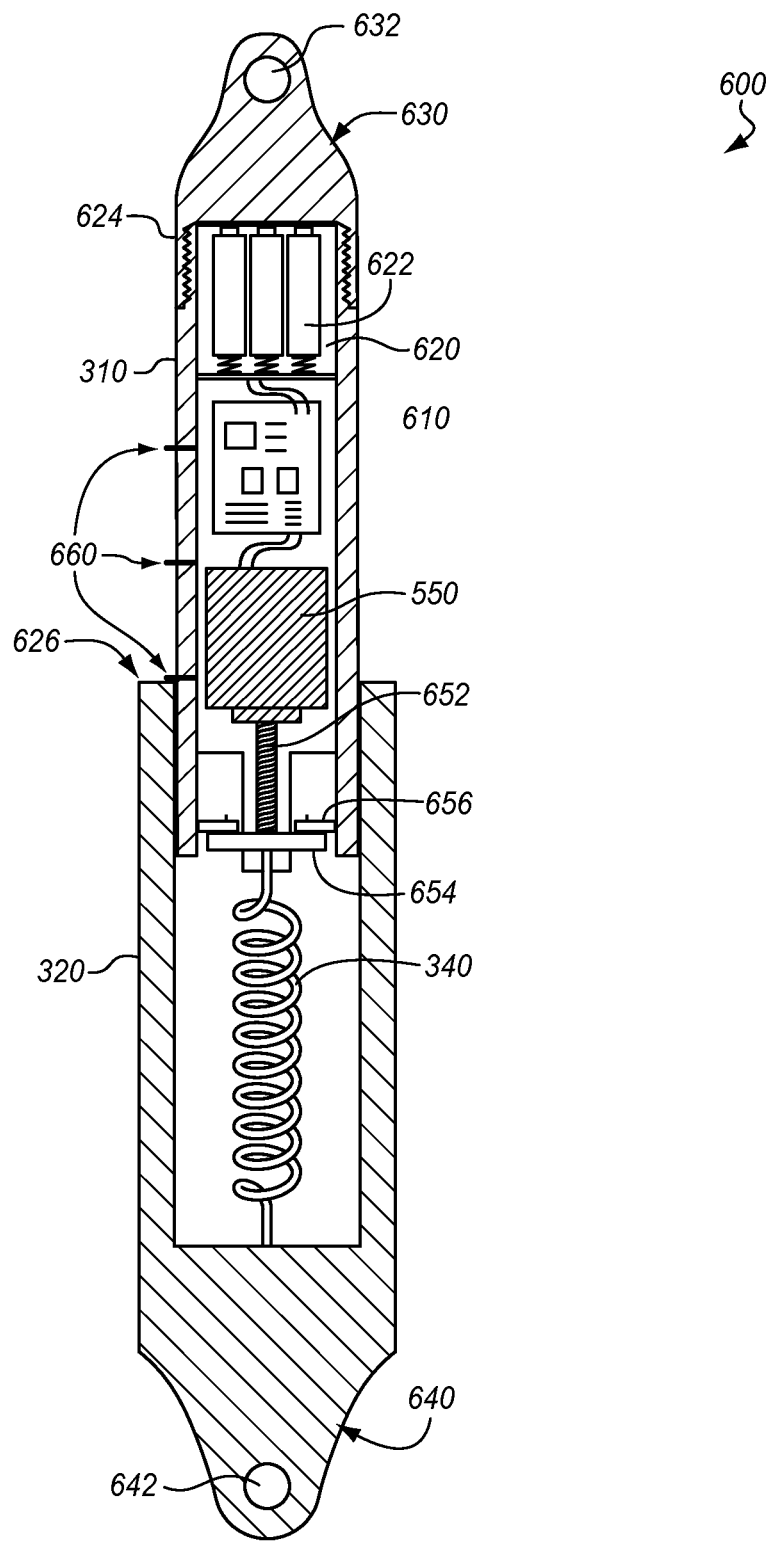
FIG. 6 illustrates a cross-sectional diagram of an adjustable rod in a further an illustrative embodiment.

FIG. 6 illustrates a cross-sectional diagram of an adjustable rod 600 in a further an illustrative embodiment. In addition to the motor 550, the adjustable rod 600 includes circuitry 610 electrically coupled with the motor 550 to control a locking mechanism. The circuitry 610 and/or the motor 550 may be powered via one or more batteries 622 in a battery compartment 620 of the adjustable rod 600. The battery compartment 620 may be accessed via a cap 624 configured to detach/attach a top distal end 630 of the adjustable rod 600 to reveal the battery compartment 620 for battery replacement. The top distal end 630 includes a first attachment hole 632 for attaching the adjustable rod 600 to an aircraft wall. Similarly, a bottom distal end 640 includes a second attachment hole 642 for attaching the adjustable rod 600 to a door stop structure or imitated door stop structure.

Additionally, the adjustable rod 600 includes length gradations 660 that indicate a body length of the adjustable rod 600. In this example, the length gradations 660 include markings along the external surface of the upper portion 310 that indicate a current rod length as revealed proximate to a rim 626 of the lower portion 320. The adjustable rod 600 therefore provides an indication for visually determining the appropriate length setting for a final part. For example, the length gradations 660 may indicate a total distance from the first attachment hole 632 to the second attachment hole 642.

Furthermore, the mechanism for locking/unlocking the adjustable rod 600 includes a driving member 652, a plate body 654, and one or more prongs 656. The driving member 652 mechanically couples the motor 550 with the plate body 654. The prongs 656 are attached with the plate body 654 and configured to radially expand and retract under the rotational force applied by the motor 550.

Figure 7:
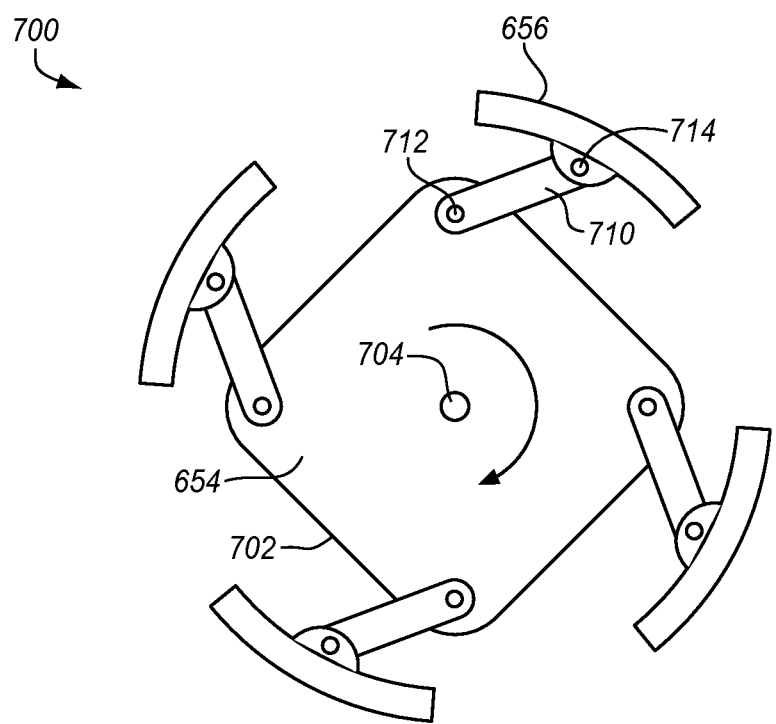
FIG. 7 illustrates a top view of a locking mechanism in an illustrative embodiment.

FIG. 7 illustrates a top view of a locking mechanism 700 in an illustrative embodiment. The plate body 654 may include a polygon shape having expansion links 710 attached around its perimeter 702 via first pivot points 712. The expansion links 710 attach with the prongs 656 via second pivot points 714. Therefore, each prong 656 is mechanically coupled with the plate body 654 via an expansion link 710 and one or more pivotable joints. Additionally, the plate body 654 is mechanically coupled with the motor 550 and/or the driving member 652 at a center attachment point 704. In this example, the plate body 654 includes a square shape having four prongs 656 connected proximate to its four corners. However, it will be appreciated that alternative shapes and component arrangements are possible.

As the motor 550 activates, the geometry of the plate body 654 forces the prongs 656 radially inward or outward. In this example, clockwise rotation of the plate body 654 spans the prongs 656 away from the center attachment point 704 to lock the length of the adjustable rod 600. By contrast, counterclockwise rotation of the plate body 654 contracts the prongs 656 toward the center attachment point 704 to unlock the adjustable rod 600 and allow its length to adjust under the force of the spring 340.

Figure 8:
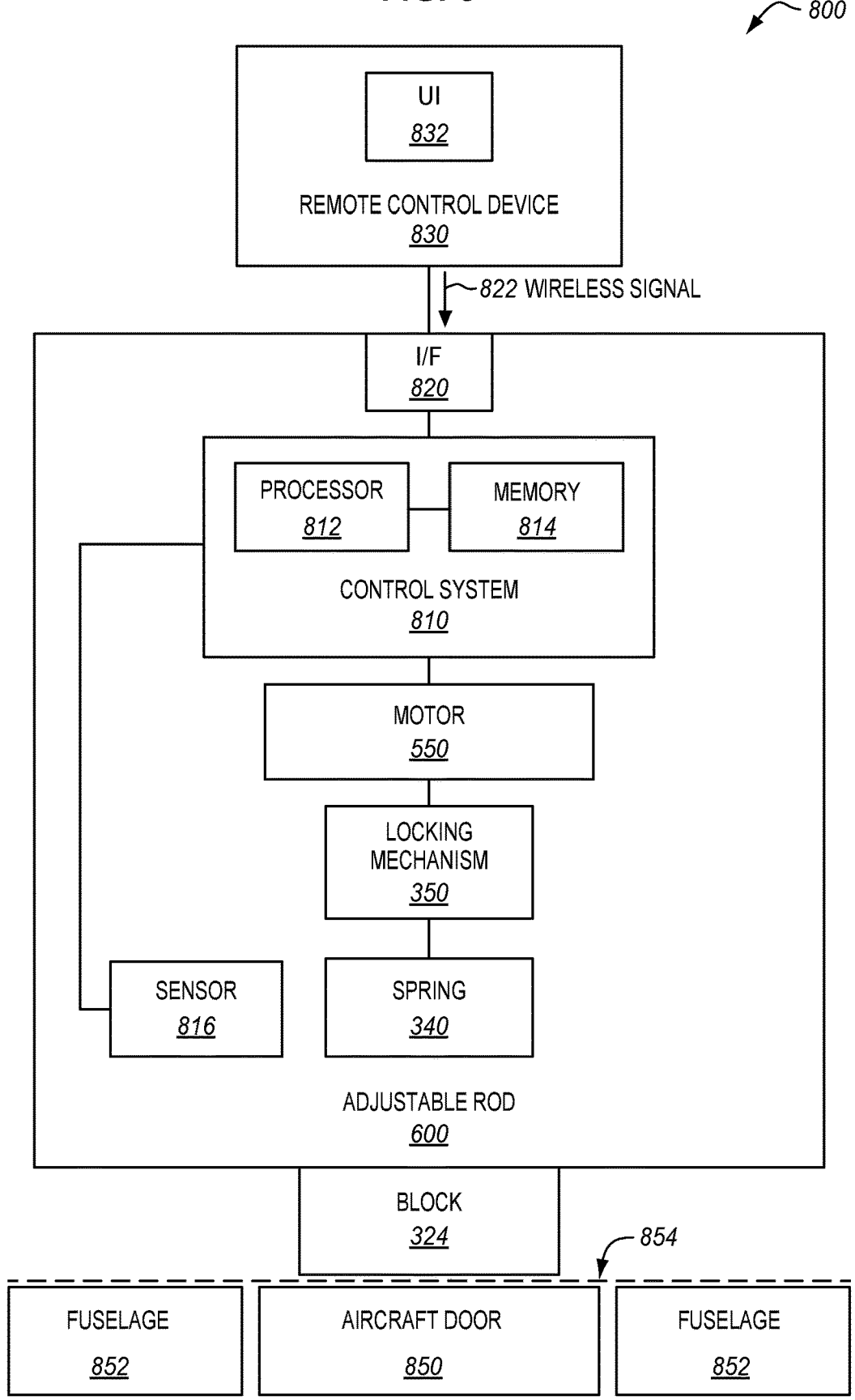
FIG. 8 is a block diagram of a system for operating an adjustable rod in an illustrative embodiment.

FIG. 8 is a block diagram of a system 800 for operating the adjustable rod 600 in an illustrative embodiment. In particular, the adjustable rod 600 includes a control system 810 electrically coupled with the motor 550 and an interface 820 configured to receive a wireless signal 822 from a remote control device 830 to remotely activate the motor 550 and internal components of the adjustable rod 600. The remote control device 830 may include a user interface 832 to receive user input for remotely locking/unlocking the length of the adjustable rod 600. Advantageously, with the adjustable rod 600 attached in the aircraft and an aircraft door 850 closed with a fuselage 852 in an aligned position 854, the adjustable rod 600 is able to remotely unlock to automatically extend its length until the block 324 aligns with the back surface of the aircraft door 850.

The control system 810 may also electrically couple with a sensor 816 configured to detect a length of the adjustable rod 600. For example, the sensor 816 may be disposed proximate to the spring 340 to detect an adjustment length of the spring 340 from its locked/compressed position to its unlocked/released position. The control system 810 may receive and/or calculate the length of the adjustable rod 600 based on measurements provided by the sensor 816. Additionally, the control system 810 may indicate the length of the adjustable rod 600 to a user via the interface 820.

The control system 810 may comprise hardware, software, or a combination of hardware and software. For example, the control system 810 may include a processor 812, which includes any electronic circuits and/or optical circuits that are able to perform functions. The processor 812 may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel® Core™ processors, Advanced Reduced Instruction Set Computing (RISC) Machines (ARM®) processors, etc. The control system 810 may also include memory 814, which may include any electronic circuits, optical circuits, and/or magnetic circuits that are able to store data.

Figure 9:
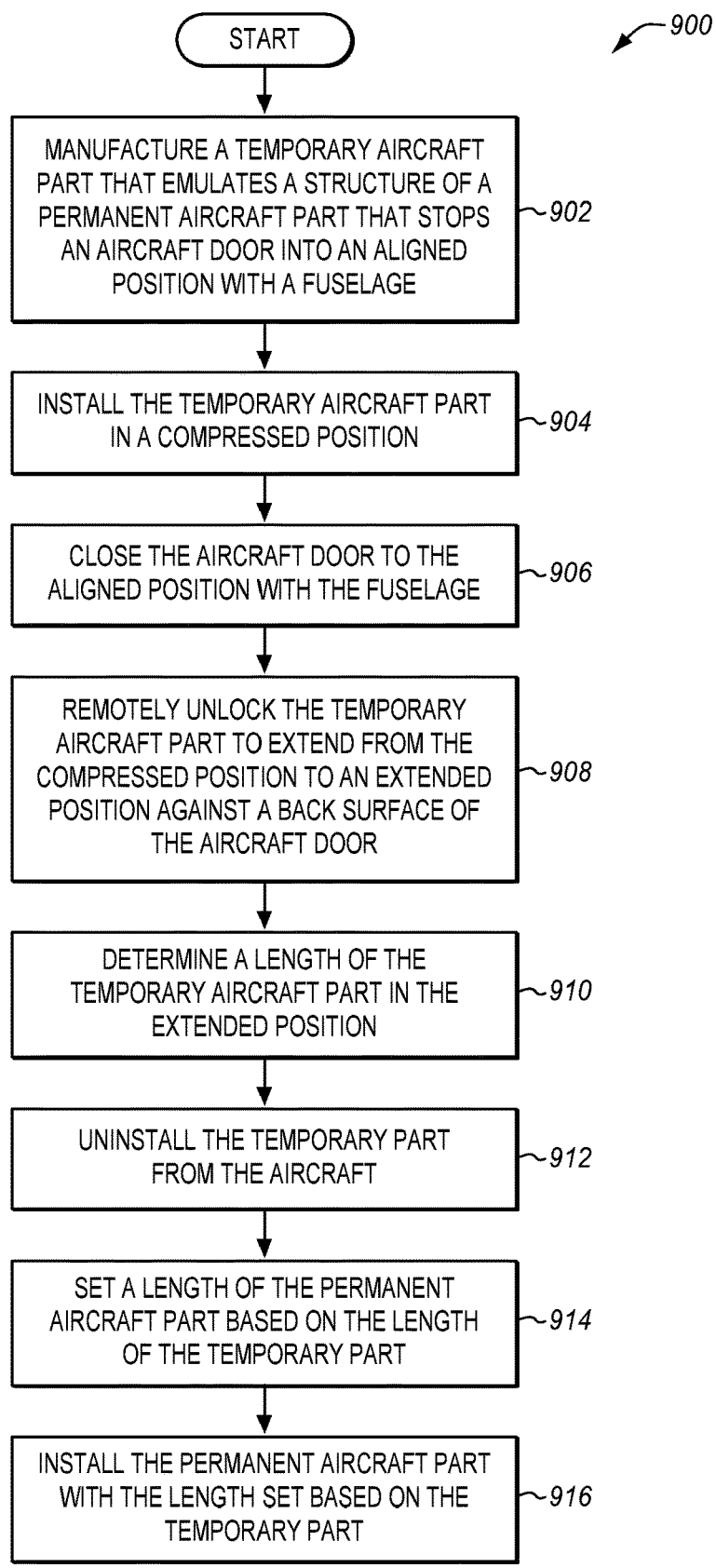
FIG. 9 is a flowchart illustrating a method for aligning an aircraft door in another illustrative embodiment.

FIG. 9 is a flowchart illustrating a method 900 for aligning an aircraft door in another illustrative embodiment. The steps of the flowchart(s) will be described with reference to FIG. 8, but those skilled in the art will appreciate that the methods may be performed with other systems and devices. The steps of the flowchart(s) described herein are not all inclusive, may include other steps not shown, and may be performed in an alternative order.

In step 902, a temporary aircraft part is manufactured that emulates a structure of a permanent aircraft part that stops the aircraft door 850 into the aligned position 854 with the fuselage 852. In step 904, the temporary aircraft part is installed in a compressed position. In step 906, the aircraft door 850 is closed to the aligned position 854 with the fuselage 852.

In step 908, the temporary aircraft part is remotely unlocked to extend from the compressed position to an extended position against a back surface of the aircraft door 850. For example, in response to receiving the wireless signal 822 from the remote control device 830, the control system 810 activates the motor 550 to unlock the temporary aircraft part. In step 910, a length of the temporary part in the extended position is determined. For example, the aircraft technician may determine the length via length gradations on the body of the temporary part or via a sensor disposed in the temporary part.

In step 912, the temporary part is uninstalled from the aircraft. In step 914, a length of the permanent aircraft part is set based on the length of the temporary part determined in step 910. Then, in step 916, the permanent aircraft part is installed with the length set based on the temporary part.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A door alignment tool configured to temporarily install on an aircraft, the door alignment tool comprising:
   a plurality of adjustable rods configured to temporarily install on the aircraft to emulate support rods that support a door stop for a door of the aircraft, each of the adjustable rods including:
      a telescopic body configured to extend and retract in length, wherein a first end of the telescopic body attaches to a wall of the aircraft;
      a base block attached to a second end of the telescopic body opposite the first end, and having a dimension corresponding with a respective dimension of the door stop;
      a spring configured to compress to reduce the length of the telescopic body, and to expand to extend the length of the telescopic body;
      a locking mechanism configured to lock the telescopic body at a fixed length to prevent expansion of the spring, and to unlock the telescopic body to release the spring and adjust the telescopic body to an adjusted length with the base block positioned against a back surface of the door while the door is closed to an aligned position; and
      a length indicator that indicates the adjusted length which corresponds with a length setting of a corresponding support rod when the adjustable rod is uninstalled and the support rod is installed on the aircraft.

2. The door alignment tool of claim 1 where each of the adjustable rods further includes:
   a motor configured to drive the locking mechanism; and
   circuitry electrically coupled with the motor and configured to actuate the motor in response to receiving a wireless signal from a remote control device.

3. The door alignment tool of claim 2 wherein:
   the locking mechanism includes a plate body mechanically coupled with the motor, and a plurality of prongs attached around a perimeter of the plate body via pivot points, and
   the motor is configured to rotate the plate body to radially expand the prongs to lock the telescopic body.

4. The door alignment tool of claim 3 wherein:
   the telescopic body includes an upper portion and a lower portion, and
   the motor is configured to rotate the locking mechanism to radially expand the prongs and lock the upper portion and the lower portion together.

5. The door alignment tool of claim 3 wherein:
   the motor is configured to rotate the plate body in an opposite direction to radially retract the prongs to unlock the telescopic body.

6. The door alignment tool of claim 1 wherein:
   the length indicator comprises length gradations that include markings on an external surface of the telescopic body that indicate the adjusted length.

7. The door alignment tool of claim 1 wherein:
   the telescopic body includes an upper portion and a lower portion that overlap one another to form a hollow cavity enclosed within the telescopic body, and
   the spring and the locking mechanism are disposed inside the hollow cavity.

8. The door alignment tool of claim 1 wherein:
   the door is a main landing gear door of the aircraft.

9. The door alignment tool of claim 1 wherein:
the length indicator comprises a sensor configured to detect the adjusted length.

10. The door alignment tool of claim 9 further comprising:
a control system configured to indicate the adjusted length of the adjustable rod to a user via an interface based on measurements provided by the sensor.

11. A method comprising:
temporarily installing a plurality of adjustable rods on an aircraft to emulate support rods that support a door stop for a door of the aircraft, each of the adjustable rods includes:
- a telescopic body that extends and retracts in length, wherein a first end of the telescopic body attaches to a wall of the aircraft;
- a base block attached to a second end of the telescopic body opposite the first end, and having a dimension corresponding with a respective dimension of the door stop;
- a spring configured to compress to reduce the length of the telescopic body, and to expand to extend the length of the telescopic body;
- a locking mechanism configured to lock the telescopic body at a fixed length to prevent expansion of the spring, and to unlock the telescopic body to release the spring and adjust the telescopic body to an adjusted length; and
- a length indicator that indicates the adjusted length;

closing the door to an aligned position;
for each of the adjustable rods, actuating the locking mechanism to unlock the telescopic body to release the spring and adjust the telescopic body to the adjusted length with the base block positioned against a back surface of the door while the door is in the aligned position, and setting a length of a corresponding support rod based on the adjusted length;
uninstalling the adjustable rods from the aircraft; and
installing the support rods on the aircraft.

12. The method of claim 11 further comprising:
determining the adjusted length of each of the adjustable rods via length gradations that include markings on an external surface of the adjustable rods.

13. The method of claim 11 further comprising:
temporarily installing the adjustable rods in a compressed position; and
unlocking the locking mechanism in each of the adjustable rods with a remote control device.

14. The method of claim 13 wherein:
the unlocking releases each of the adjustable rods from the compressed position to the adjusted length.

15. The method of claim 13 wherein:
the unlocking includes rotating a plate body of the locking mechanism with a motor to radially retract prongs attached to the plate body.

16. The method of claim 11 further comprising:
installing the support rods of the door stop as final parts of the aircraft.

17. A method comprising:
temporarily installing a plurality of adjustable rods on an aircraft to emulate support rods that support a door stop for a door of the aircraft, each of the adjustable rods includes:
- a telescopic body that extends and retracts in length between a compressed position and a released position, wherein a first end of the telescopic body is attached to a wall of the aircraft;
- a base block attached to a second end of the telescopic body opposite the first end, and having a dimension corresponding with a respective dimension of the door stop;
- a spring configured to compress to reduce the length of the telescopic body, and to expand to extend the length of the telescopic body;
- a locking mechanism configured to lock the telescopic body at a fixed length to prevent expansion of the spring, and to unlock the telescopic body to release the spring and adjust the telescopic body to an adjusted length; and
- a length indicator that indicates the adjusted length;

closing the door to an aligned position;
for each of the adjustable rods, remotely unlocking the locking mechanism to extend the telescopic body from the compressed position to the extended position with the base block positioned against a back surface of the door while the door is in the aligned position, and determining the adjusted length of the adjustable rod at the extended position based on the length indicator;
uninstalling the adjustable rods from the aircraft;
setting lengths of the support rods based on the adjusted length of a corresponding adjustable rod; and
installing the support rods on the aircraft.

18. The method of claim 17 wherein determining the adjusted length of the adjustable rod comprises:
determining the adjusted length via length gradations that include markings on an external surface of the adjustable rod.

19. The method of claim 17 wherein determining the adjusted length of the adjustable rod comprises:
determining the adjusted length based on measurements from a sensor.

20. The method of claim 17 wherein remotely unlocking the locking mechanism comprises:
rotating a plate body of the locking mechanism with a motor to radially retract prongs attached to the plate body.

* * * * *